United States Patent
Inada et al.

(10) Patent No.: US 7,123,321 B2
(45) Date of Patent: Oct. 17, 2006

(54) COLOR FILTER COMPRISING UNIT PATTERNS WITH VARIED DENSITIES AND LIQUID CRYSTAL DISPLAY DEVICE USING THE COLOR FILTER, AND THEIR MANUFACTURING METHODS

(75) Inventors: Toshiya Inada, Kobe (JP); Noriyoshi Matsuura, Nishinomiya (JP); Miho Il, Kakogawa (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 49 days.

(21) Appl. No.: 10/482,987

(22) PCT Filed: Jul. 8, 2002

(86) PCT No.: PCT/IB02/02882

§ 371 (c)(1),
(2), (4) Date: Jan. 7, 2004

(87) PCT Pub. No.: WO03/005929

PCT Pub. Date: Jan. 23, 2003

(65) Prior Publication Data

US 2004/0239841 A1    Dec. 2, 2004

(30) Foreign Application Priority Data

Jul. 12, 2001 (JP) ............................ 2001-211780
Nov. 5, 2001 (JP) ............................ 2001-339674

(51) Int. Cl.
*G02F 1/1335* (2006.01)
(52) U.S. Cl. .................... 349/106; 349/114; 349/112
(58) Field of Classification Search ......... 349/106–109
See application file for complete search history.

(56) References Cited

U.S. PATENT DOCUMENTS

| | | | |
|---|---|---|---|
| 6,628,355 B1 * | 9/2003 | Takahara | 349/106 |
| 6,636,286 B1 * | 10/2003 | Baek | 349/114 |
| 2001/0004276 A1 * | 6/2001 | Urabe et al. | 349/106 |
| 2002/0018159 A1 * | 2/2002 | Kim et al. | 349/106 |
| 2002/0167278 A1 * | 11/2002 | Yoon | 315/169.3 |
| 2003/0011729 A1 * | 1/2003 | Song et al. | 349/107 |

* cited by examiner

*Primary Examiner*—Andrew Schechter
*Assistant Examiner*—W. Patty Chen

(57) ABSTRACT

An object of the invention is to provide a color filter and a liquid crystal display device using the filter, which can obtain well-balanced color purities within a pixel. A color filter for coloring a first light ray L1 having a unidirectional optical path and a second light ray L2 having a bidirectional optical path for each pixel. The color filter includes a first area portion 10t in which the first light ray L1 is caused to be transmitted and a second area portion 10r in which the second light ray L2 is caused to be transmitted, for each pixel. The first area portion 10t and the second area portion 10r respectively have structures by which different coloring effects are exerted if light rays having the same optical path and the same property pass through them.

26 Claims, 15 Drawing Sheets

COLOR FILTER COMPRISING UNIT PATTERNS WITH VARIED DENSITIES AND LIQUID CRYSTAL DISPLAY DEVICE USING THE COLOR FILTER, AND THEIR MANUFACTURING METHODS

BACKGROUND OF THE INVETNION

1. Field of the Invention

The present invention relates to a color filter and a liquid crystal display device using the color filter.

In particular, the present invention relates to a color filter which handles a first light ray and a second light ray. The first light ray has such a uni-directional optical path that the light ray incident from one principal plane side of the filter passes through the filter only once to be colored and is guided to the other principal plane side of the filter. The second light ray has such a bi-directional optical path that the light ray incident from the other principal plane side of the color filter passes through the filter to be colored and the passed light ray is reflected by an optical reflective element or the like disposed in the one principal plane side to enter the filter again and pass to be colored, and comes back to the other principle plane side. The invention also relates to a method of manufacturing the color filter. The invention further relates to a liquid crystal display device using such a color filter, and to a method of manufacturing the liquid crystal display device.

2. Description of Related Art

A liquid crystal display device, what is called the transflective type liquid crystal display device, becomes in full practical use, wherein external light incident from the front side is reflected to be guided to the front side while being provided with an optical modulation according to the image to be displayed, and incident light from the back light system on the rear side is passed to the same front side while being likewise provided with the optical modulation according to the image to be displayed. This type of liquid crystal display device effectively performs displays of image based on the external light (ambient light) mainly when the operating environment is bright (reflective mode) and based on emission light from the back light system mainly when it is dark (transmissive mode).

Such a type of liquid crystal display device is disclosed in a prior art document, "Development of Advanced TFT with Good Legibility under Any Intensity of Ambient Light" by M. Kubo et al., IDW' 99, Proceedings of The Sixth International Display Workshops, AMD3–4, page 183–186, Dec. 1, 1999, sponsored by ITE and SID. In this device, each pixel electrode is divided into a reflection area and a transmission area. The reflection area is a reflection electrode part formed from aluminium with which an acrylic resin with a rough surface is covered, and the transmission area is a transparent electrode part formed from ITO (Indium Tin Oxide) with a flat surface. The transmission area is situated in the center of a rectangular pixel area and has a substantially similar rectangular figure like the pixel area, whereas the reflection area is a part of the pixel area other than the rectangular transmission area and has a form of surrounding the transmission area. By virtue of the pixel configuration etc, the legibility is improved.

SUMMARY OF THE INVENTION

However, in the prior art liquid crystal display device, the transmission area and the reflection area are different in color purity of the displayed color although these areas are in the same pixel area. It is supposed that this problem results from the color filter in the prior art in which the light from the back-light system and the external light whose optical paths are different from each other are colored in much the same fashion. As a result, the quality of the displayed colors is deteriorated over the display area.

In view of the above-mentioned points, it is an object of the present invention to provide a color filter and a liquid crystal display device using the color filter, which can show the well-balanced color purities within a pixel.

It is another object of the present invention to provide a color filter and a liquid crystal display device using the color filter, which can satisfactorily reproduce chromaticity over a display area.

It is a further object of the present invention to provide methods of manufacturing the color filter and the liquid crystal display device.

In order to achieve the object mentioned above, one aspect of a color filter according to the present invention is a color filter for coloring a first light ray having a unidirectional optical path and a second light ray having a bidirectional optical path for each pixel, the color filter including a first area portion in which the first light ray is caused to be transmitted and a second area portion in which the second light ray is caused to be transmitted, for each pixel, the first area portion and the second area portion respectively having structures by which different coloring effects are exerted if light rays having the same optical path and the same property pass through them.

According to this aspect, by virtue of the constitution, it is possible to desirably set the balance of a coloring effect for the first light ray in the first area portion in the transmission mode and a coloring effect for the second light ray in the second area portion in the reflection mode, so that well-balanced color purities can be acquired within a pixel.

In this aspect, the first area portion and the second area portion may have such a difference in structure that a coloring effect performed for the first light ray within a pixel by the first area portion is substantially equal to a coloring effect performed for the second light ray within a pixel by the second area portion under predetermined conditions. This scheme enables the coloring effects to be substantially equal, and much the same good visibility to be always ensured in the reflection mode as well as in the transmission mode.

Also in this aspect, the first area portion and the second area portion may have such structures that their densities of coloring elements are different from each other, or the second area portion may comprise a coloring portion that colors the second light ray and at least one colorless portion that transmits the second light ray substantially with colorlessness. According to this solution, it is possible to easy make a difference of coloring effect between the first area potion and the second area portion.

Furthermore, in this aspect, each of the first area portion and the second area portion may be formed based on a plurality of coloring element construction units, and the coloring element construction units of the first area portion may have a higher density than those of the second area portion. In this way, densities of coloring elements formed of the first and second area portions are changed in dependence on the plurality of coloring element construction units, so that the desirable coloring effects can be easy obtained by means of a normal patterning process or the like. Alternatively, each of the first area portion and the second area portion may have a coloring element surface that is patterned based on a plurality of unit patterns, and the first area portion and the second area portion may have different densities of the unit patterns. This offers an advantage in that a difference of an effective surface area size or volume of the coloring elements between the first area potion and the second area portion can be easy obtained by the patterning process. For example, there may be a color filter characterized in that the unit pattern is projection-shaped, and the unit patterns of the first area portion has a higher density than the unit patterns of the second area portion and be a color filter characterized in that the unit pattern is depression-shaped, and the unit patterns of the first area portion has a lower density than the unit patterns of the second area portion. In the latter ways respectively, the color filter according to the present invention can be obtained with ease and reliability.

Alternatively, the first area portion and the second area portion may have coloring element surfaces that are patterned based on a plurality of first unit patterns and on a plurality of second unit patterns, respectively, and the unit pattern densities of the first area portion and the second area portion may be determined in such a manner that the first and second area portions have such structures that coloring element forming densities of the first and second area portions are different from each other. This way means to propose examples in which different kinds of unit patterns are provided and configured for the unit pattern. Likewise, the first and second area portions exerting the desirable coloring effects can be easy obtained. Thereupon, the first unit pattern may have one of projection shape and depression shape, and the second unit pattern may have the other of projection shape and depression shape, so that the first and second area portions can be obtained with ease and reliability.

In the case of using the unit pattern, it preferably has a shape with a function of diffusing incident light. Accordingly, the diffused light allows a viewing angle characteristic to be improved over a display screen, and contributes to improvement of visibility.

In the above-mentioned aspect and the other kinds of concrete modes thereof, the first and second area portions can be formed with the same coloring material. This feature is characterized in that the structures (instead of the properties) of the coloring materials of the first and second area portions are altered to make their coloring effects different even in using the same coloring material. Thus characterized feature allows to avoid both processes of a forming process for the coloring material for the first area portion and a forming process for the coloring material for the second area portion. In other words, because of changing the structures of the formed coloring elements of the same material for getting the different coloring effects, it is not necessary to form the first and second area portions with the individual materials. Accordingly, the area portions require only one process wherein both are (simultaneously) formed with the same material, whereby simplification of manufacture is achieved.

In the above-recited aspects and modes thereof, the color filter may further comprise a protective film covering the first and second area portions, preferably. This scheme enables to flatten the surface of the first and second area portions that have different structures, and to strengthen the construction of the color filter.

In a certain mode of having at least one colorless portion in the second area portion, a plurality of the colorless portions are dispersedly located over the second area portion. According to this mode, the colorless portion makes the second light ray pass therethrough without color, so that its coloring efficacy on the second light ray can be reduced. This leads to retainment of the well balanced color purities of the first and second light rays obtained, so as to improve the quality of the displayed colors over the whole display area.

Also in the certain mode, the pixel area may have substantially a polygon shape on the plan view, and the colorless portion may be located in the vicinity of a corner of the polygon in a pixel area. By thus locating the colorless portion in the corner side of a pixel area, it becomes an advantage that the colorless portion is easy to be formed more accurately in comparison with the case of locating it at the inner position of a pixel area (i.e. close to the center of a pixel area).

Alternatively, the pixel area may have substantially a polygon shape on the plan view, and the colorless portion may have a shape of substantially a triangle including a corner of the polygon and having an oblique side opposed to that corner in a pixel area. Such a triangular colorless portion contributes to minimization of the length of an outline adjacent to the coloring portion, so that the step portion between the coloring portion and the colorless portion is smaller to thereby suppress the undesired behavior of light possibly caused in the step portion. In addition, the colorless portion may be isosceles-triangle-shaped on the plan view. In this case, it is able to evenly limit the variation of the effective area size of the colorless portion, which is caused by the displacement of the mask for patterning the coloring portion.

Furthermore, in the certain mode, shielding means may be preferably provided to a boundary of the pixel area. This preferred example offers an advantage in that the effective area of colorlessness of the colorless portion can be easy and accurately designed to the desired value. In particular, if the colorless portion is thus triangle-shaped, then all corner portions of the colorless portion are hidden by the shielding means such as the black matrix and all outline portions of the colorless portion appearing within a pixel area become linear shapes, so that the resultant variation of the effective coloring area can be made extremely smaller. That is, the black matrix hides, from a display screen side of the color filter, all outline portions of the colorless portion which can not be considered to have substantially a straight-line shape. However, such a result is not restricted to only a composition using the black matrix. For example, the same result is obtained also in the case of a composition such that the pixel driving bus lines formed on the substrate opposed to the color filter have a function of the black matrix as shielding means.

Furthermore, in the certain mode, the pixel area may be substantially polygon-shaped on the plan view, and the colorless portion may be formed in the vicinity of any one side of the polygon along that side. This measures also have an advantage that all outline portions of the colorless portion appearing within a pixel area can become linear shapes so as to only require a simple process while the above-mentioned advantages result.

In more advantageous mode, there may be further provided a protective layer covering the coloring portion and the colorless portion. According to this mode, said protective layer can provide not only protection of the coloring layer but also flattening of a surface of the whole coloring layer and colorless portion.

Also in the mode, a ratio of an effective area of the colorless portion to an effective area that the optical path of the second light ray occupies may be determined in a pixel area for each color to be made, or an effective area of the colorless portion may be determined in such a manner that a chromaticity of the first light ray obtained by a coloring effect of the first area portion in a pixel area is substantially equal to a chromaticity of the second light ray obtained by a coloring effect of the second area portion in the pixel area for each color to be made. Accordingly, the efficacy in reducing the coloring effect by the colorless portion can be determined rationally.

Again, in order to achieve the object mentioned above, a liquid crystal display device of another aspect according to the present invention uses a color filter according to the previously mentioned aspect. In the aspect, there may be provided a transflective liquid crystal display device characterized in that: the color filter is provided to one substrate of the liquid crystal display device; the other substrate is provided with a pixel electrode comprising a transmissive electrode part for making the first light ray to be transmitted therethrough and a reflective electrode part for making the second light ray to be reflected therefrom; and the first area portion in the color filter corresponds to the transmissive electrode part while the second area portion corresponds to the reflective electrode part. Such a liquid crystal display device can have the well-balanced color purities in each pixel, so that a high quality of color reproduction is obtained. As stated above, if the bus lines have the function of the black matrix and the colorless portion is be provided, then the colorless portion should be arranged in such a manner that the bus lines hide the non-linear portions of the colorless portion. As a result, it offers an advantage of reduction of the variation of the effective area as stated above.

And, again, in order to achieve the object mentioned above, a manufacturing method for a color filter of the other aspect according to the present invention is a method of manufacturing a color filter for coloring a first light ray having a unidirectional optical path and a second light ray having a bidirectional optical path for each pixel, comprising: a coloring material deposition step of depositing a coloring material for coloring the first and second light rays on a base layer; and a step of patterning the deposited layer of coloring material to form, for each pixel, a first area portion in which the first light ray is caused to be transmitted and a second area portion in which the second light ray is caused to be transmitted, the first area portion and the second area portion respectively having structures by which different coloring effects are exerted if light rays having the same optical path and the same property pass through those area portions. In this aspect, the method may further comprise a step of forming a black matrix for delimiting a pixel area on the base layer before the coloring material deposition step. Additionally, the method may further comprise a step of forming a protective layer on the first and second area portions. These result in a relatively simple way for manufacturing the color filter whereby the aforementioned effects/advantages are accomplished.

In order to achieve the object mentioned above, a manufacturing method for a liquid crystal display device of yet another aspect according to the present invention is a manufacturing method for a liquid crystal display device using the above mentioned color filter, wherein the color filter is provided to one substrate of the liquid crystal display device and the other substrate is provided with a pixel electrode comprising a transmissive electrode part for making the first light ray to be transmitted therethrough and a reflective electrode part for making the second light ray to be reflected therefrom, the manufacturing method further comprising a step of aligning the first area portion in the color filter with the transmissive electrode part. In this way, the liquid crystal display device which fully performs the advantages of the above-mentioned color filter can be surely manufactured.

DESCRIPTION OF THE PREFERRED EMBODIMENT(S)

Now the above-mentioned aspects and other aspects according to the present invention will be described in more detail with reference to the accompanying drawings.

[Embodiment 1]

Figure 1:
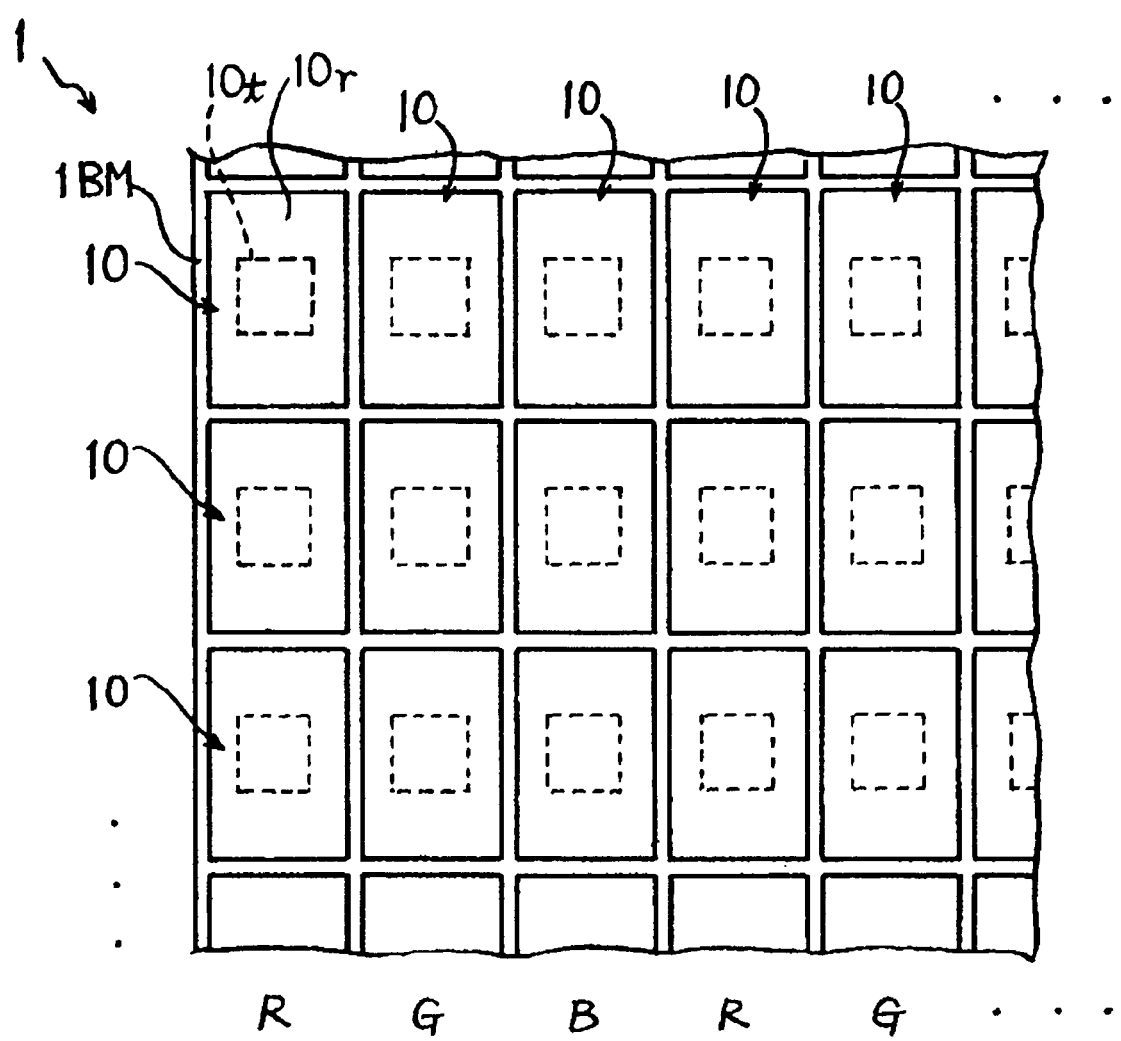
FIG. 1 is a schematic plan view of a color filter used in a liquid crystal display device according to the first embodiment of the present invention.

FIG. 1 schematically shows in a plan view a color filter 1 used in one embodiment of transflective type liquid crystal display device according to the invention.

This color filter 1 is divided into longitudinal coloring area portions each of which extends in a vertical direction of a display screen (up-and-down direction in FIG. 1), and which have coloring matters of the primary colors of light, e.g. red (R), green (G) and blue (B), respectively. These longitudinal coloring area portions are cyclically arranged in order of R, G and B in a horizontal direction of the display screen. One longitudinal coloring area portion (one column) may be further divided into portions in the vertical direction, and each of the divisional portions corresponds to a pixel. The divisional portion will be called a pixel portion 10 hereinafter. The boundaries of the pixel portions 10 are provided with a black matrix 1BM for, e.g. protecting the gap between the pixel portions from leaking the light. Although the longitudinal coloring area portions are divided in the vertical direction in FIG. 1, the pixel portions 10 (the pixel portions 10 vertically aligned) of one longitudinal coloring area portion are neither isolated materially nor physically in this embodiment.

The pixel portion 10 has: a first area portion 10*t* (shown by an area enclosed by doted lines in the Figure) which allows transmission of a first light ray L1 having a unidirectional optical path and being emitted from the back light system; and a second area portion 10*r* that is a part of the area 10 except for the first area portion 10*t*, which allows transmission of a second light ray L2 having a bidirectional optical path and being incident from a display screen to be transmitted and again incident from the opposite side after transmitted. The first area portion 10*t* and the second area portion 10*r* have such a structure that they have different coloring effects when light rays having the same optical path and the same property are transmitted through them, as mentioned below.

Figure 2:
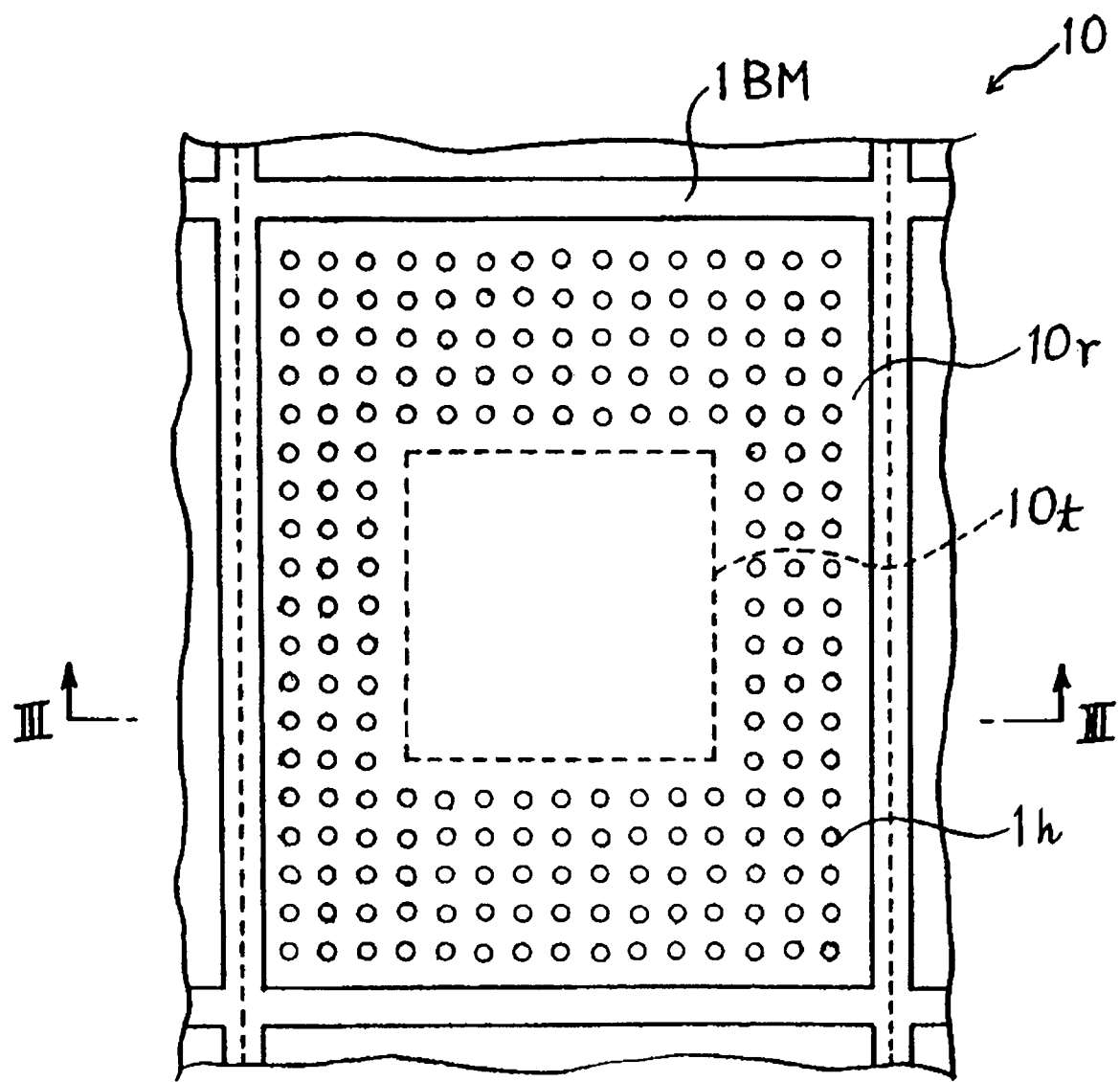
FIG. 2 is a schematic enlarged plan view of one pixel area of the color filter of FIG. 1.
Figure 3:
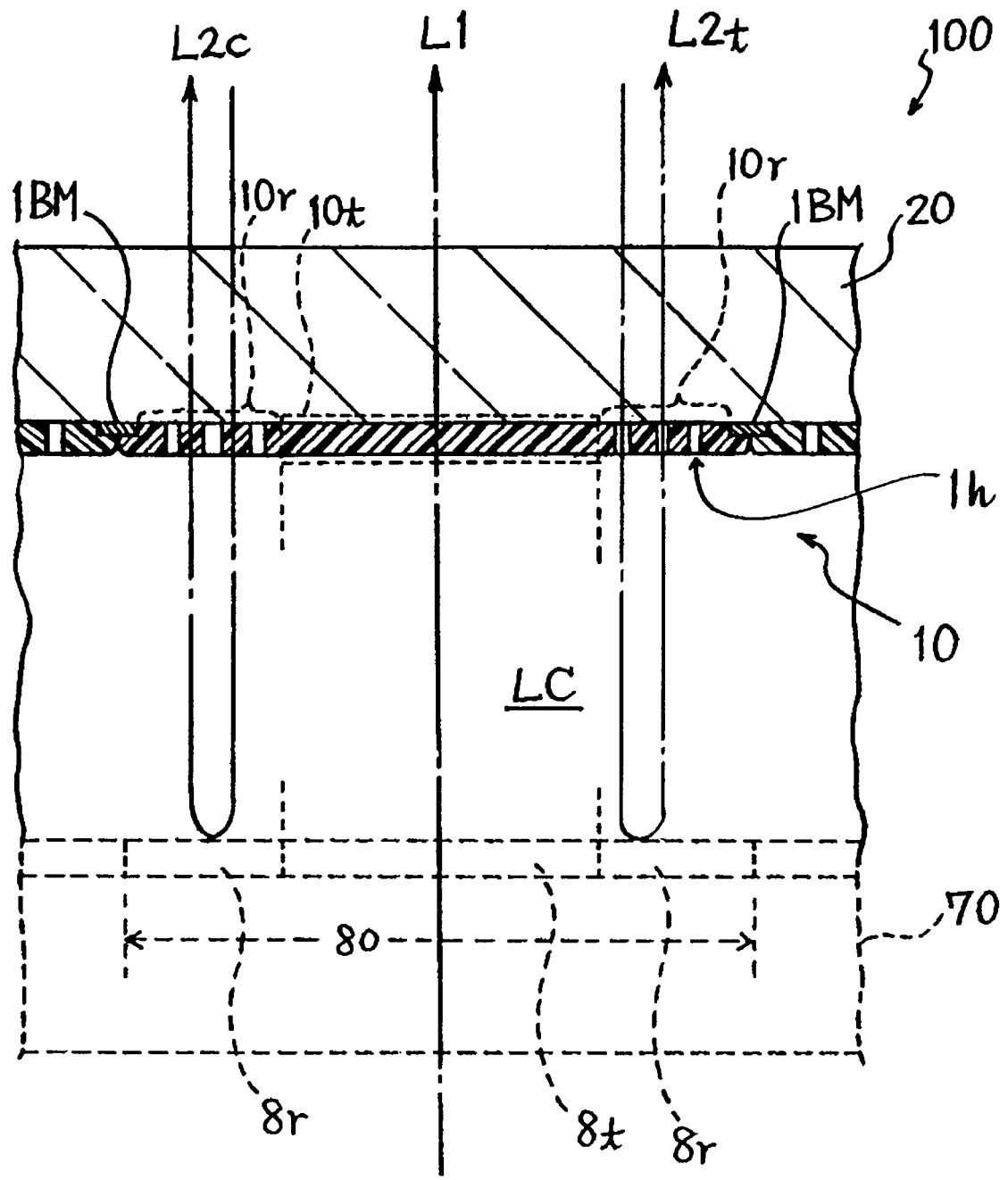
FIG. 3 is a schematic cross sectional view of the color filter taken along the cutting line III—III of FIG. 2 when incorporating it into a liquid crystal display panel.

FIG. 2 schematically shows an enlarged plan view of one of the pixel portions 10, and FIG. 3 shows a III—III cross-sectional view of FIG. 2 in the case where the color filter is incorporated into a liquid crystal display panel 100. FIG. 2 is a plan view of a pixel portion 10 of the liquid crystal display panel 100 in the case where one views from its front side (i.e., from the upper side in FIG. 3). It is noted that FIG. 3 shows a fundamental composition of the liquid crystal display panel, wherein the minor layers, films and construction thereof are omitted for the purpose of making clear illustration.

The first area portion 10*t* and the second area portion 10*r* of the pixel area portion 10 are both formed with the same coloring material, but their structures are different respectively. The first area portion 10*t* corresponds to a transparent area (transmissive electrode section) 8*t* of a pixel electrode 80 provided on a substrate 70 opposed to the area portion 10*t* via a liquid crystal layer LC. The second area portion 10*r* corresponds to a reflective area (reflective electrode section) 8*r* of the pixel electrode 80. It is clear from FIG. 2 that the second area portion 10*r* is provided with many through holes 1*h* as colorless portions. Accordingly, the second area portion 10*r* is composed of the colorless portions and a coloring portion other than the colorless portions.

The through holes 1*h* do not have the coloring material, so that they allows a part L2*t* of the second light ray to be transmitted therethrough with colorlessness in the second area portion 10*r*. On the other hand, the coloring portion of the second area portion 10*r* is a section in which the coloring material is formed, so that it allows a part L2*c* of the second light ray to be transmitted to color the part L2*c* in the second area portion 10*r*. By contrast, the first area portion 10*t* is composed of a coloring layer with no colorless portion, so that the first light ray L1 passed through the first area portion 10*t* can be colored at any position of the portion 10*t*.

In a plan view, the first area portion 10*t* is a rectangle whose center is at a center of the pixel area; the second area portion 10*r* is in a form that is a part except that rectangle area and surrounds the first area portion. Thus, this embodiment is built on premises that each electrode section of the pixel electrode 80 is also shaped nearly equal to shapes of these area portions 10*t*, 10*r* on the plan view.

As shown in FIG. 3, the pixel portion 10 is formed on substrate 20 and black matrix 1BM in an area defined by the black matrix 1BM. The black matrix 1BM is provided on the transparent substrate 20 on a front side of the liquid crystal display panel, formed inside the panel, made from a light shield material and serves as light shield means.

The through holes 1*h* can be easy formed by performing a patterning process with a mask for forming the holes in the case of forming the above-mentioned longitudinal coloring area portions using a coloring material for each color. Because such a patterning process per se is well-known, it will not be described anymore.

Now, effects and advantages of this embodiment are described.

The first light ray L1 is emitted from a back light system (not shown), and it is colored by the coloring material of the first area portion 10*t* after passing through the transparent electrode portion 8*t* and the liquid crystal layer LC, whereupon the light ray L1 is guided to the outside of the panel on the front side. On the other hand, the second light ray L2 from the front side of the panel is transmitted through the transparent substrate 20, and is once colored or not colored at all by passing through the coloring portion or the through holes 1*h* of the second area portion 10*r*, and then reaches the reflecting electrode part 8*r* through the liquid crystal layer LC. Then, the second light ray L2 is reflected by the reflecting electrode part 8*r*, and is guided to the second area 10*r* after again passing through the liquid crystal layer LC. The second light ray L2 having thus returned to the second area portion 10*r* is transmitted through the coloring portion or the through holes 1*h* of the second area portion 10*r* again with or without it being colored, and is guided to the outside of the panel on the front side. FIG. 3 illustrates the case where the second light ray L2*c* passes through the coloring portion when it is first incident on the second area portion 10*r* as well as when it is again incident on the second area portion and the case where the second light ray L2*t* passes through the through holes 1*h* when it is first incident on the second area portion 10*r* as well as when it is again incident on the second area portion. In these cases, the second light ray L2*c* is fully subjected to the coloring effect, but the second light ray L2*t* is not subjected to it at all. However, in actual fact, there would be the cases where the second light ray L2 is colored or uncolored in only one of a going path and a returning path of the second light ray L2.

Since the through holes 1*h* do not color the incident light rays as mentioned above, the coloring effect for the second light ray L2 entering the second area portion 10*r* can be made to be different from that for the first light ray L1 in the first area portion 10*t*, so that the coloring effect for the light L2 can be desirably decreased. That is, the first area portion 10*t* and the second area portion 10*r* have such structures that the portions 10*t* and 10*r* present desirably different coloring effects when the light rays having the same optical path and the same property are transmitted through the portions. According to this structure, there are advantages as follows.

Since the first area portion 10*t* colors the transmitted light ray L1 having a unidirectional optical path from the backlight system, the coloring effect is exerted only once. By contrast, the second area portion 10*r* colors the reflected light ray L2 having a bidirectional optical path, so that it has two chances to exert the coloring effect. Therefore, thinking about light rays of substantially equal property (including an intensity, a wavelength characteristic, etc.), the reflected light L2 would be subjected to (sensuously) almost twice degree of coloring effect as much as in the transmitted light L1. Thereby, the color purity reproduced for the reflected light ray L2 and the color purity reproduced for the transmitted light ray L1 may be different within a pixel, and as a result the quality of the color reproduction would be deteriorated in a whole of the display area. However, in this embodiment, in order to prevent the deviation of the coloring effect to the reflected light, a structure of a coloring section for the reflected light is made to be different from a structure of a coloring section for the transmitted light by providing only the second area portion 10t with a plurality of through holes 1h as colorless portions. Thus, the coloring effect area for the reflected light ray L2 can be reduced, and the area through which the reflected light ray L2 passes can be partly colorless. Accordingly the coloring effect for the reflected light is reduced within a pixel so as to bring the coloring effects for the transmitted light L1 and the reflected light L2 into balance. It is noted that a term "coloring effect" stated herein means an efficacy representing the degree of coloring such as color purity, chromaticity, brightness or the like that is obtained under predetermined conditions including intensity, wavelength characteristic, and incident area and the like of the incident light.

As a result, the balanced coloring purities of the transmitted light ray L1 and the reflected light ray L2 are obtained within a pixel, with total considering, while contributing to improving the displayed colors across the whole display area.

In the embodiment as stated above, in order to make a difference of the coloring effects between the first area portion 10t and the second area portion 10r, the multiple through holes 1h are dispersedly arranged in the second area portion 10r like a grid pattern. Alternatively, such through holes can have other arrangements such as a random arrangement by design, and the number thereof and area sizes can be determined as appropriate.

As stated above, the colorless portions 1h are for reducing the coloring effect of the reflected light L2. Next its more concrete examples will be described regarding their area size and the like.

Now, assuming that S is an effective area of a pixel in question, St is an effective area of the first area portion 10t, Sr is an effective area (an area size of the reflecting electrode part 8r or an area on which all the reflected light L2 is incident) of the second area portion 10r, Sn is a total effective area of the colorless portions 1h, the respective areas being for one pixel. A spectral reflectance R in the reflection mode under a condition of a predetermined optical modulation of the liquid crystal layer LC may be expressed as follows.

$$R=\{L2t \cdot Sn/Sr + L2c \cdot (Sr-Sn)/Sr\} \cdot Sr/S \quad (1)$$

On the other hand, a spectral transmittance T in the transmission mode under the same condition may be expressed as follows.

$$T = L1 \cdot St/S \quad (2)$$

In the above-mentioned equations, L1, L2t and L2c mean ratios of an intensity of light ray inputted into the liquid crystal display panel to its original intensity.

R is calculated for each of R, G and B based on the above expression, where L2c and L2t are derived from substantially natural light (or light from the front light), and the calculated result leads to a chromaticity that would be yielded in the corresponding coloring layer portion. T is calculated for each one based on the above expression, where L1 is derived from the used back-light, and the calculated result leads to a chromaticity that would be yielded in the corresponding coloring layer portion. The value of Sn may be determined such that these chromaticities are equal to each other for each of the colors. In accordance with such a concept, a ratio (Sn/Sr) of Sn to Sr can be obtained for each color of R, G and B. The respective examples of the ratios in percentage are as follows, and the well results have been obtained by using these values.

The pixel of R: from 5 to 15%
The pixel of G: from 15 to 30%
The pixel of B: from 3 to 8%

[Embodiment 2]

Now another embodiment according to the present invention will be described.

Figure 4:
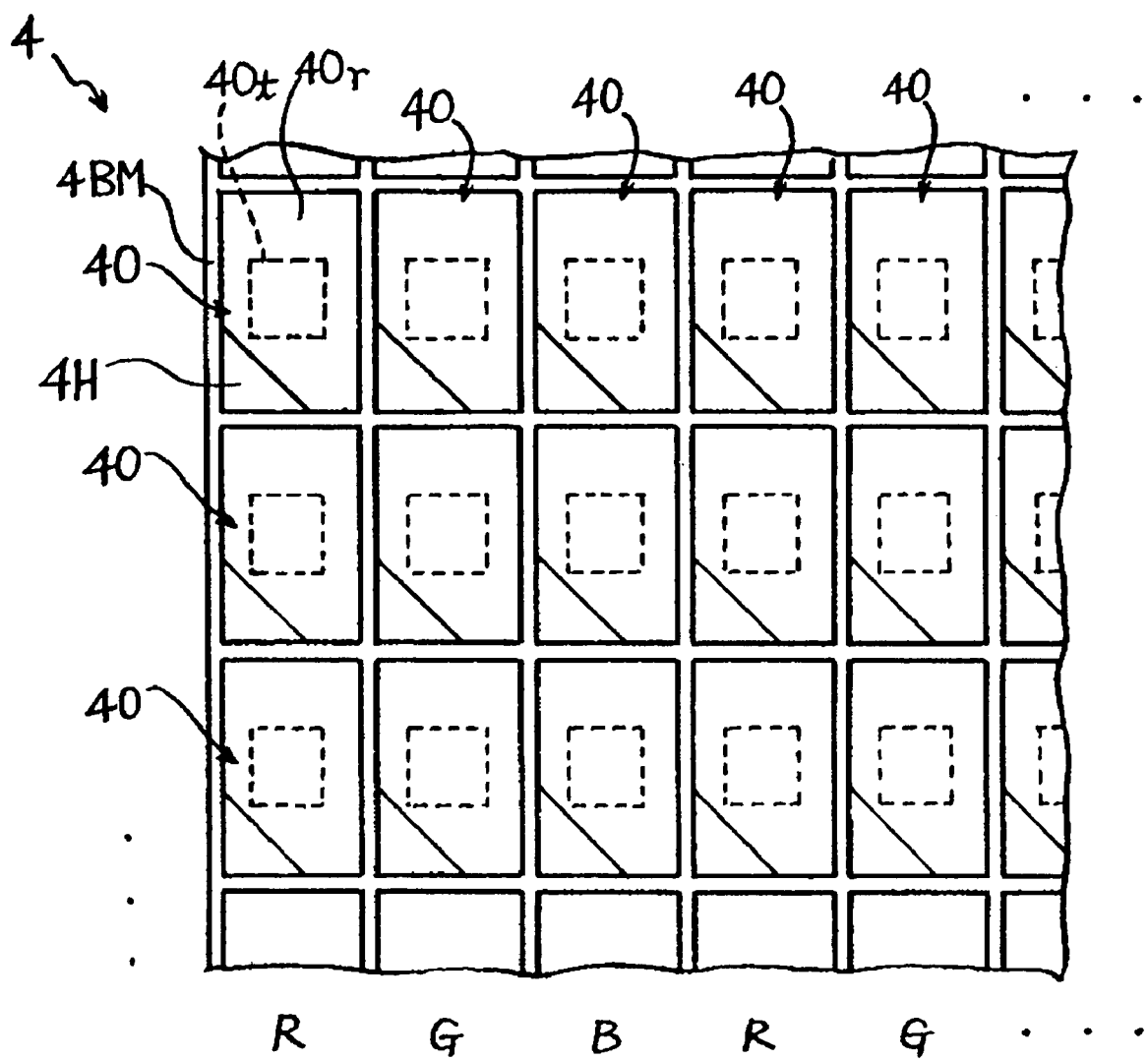
FIG. 4 is a schematic plan view of a color filter used in a liquid crystal display device according to the second embodiment of the present invention.

FIG. 4 schematically shows a plan view of the color filter 4 used for a transflective type liquid crystal display device according to this embodiment.

In this color filter 4, the arrangement forms of the pixel portion 40 that is the divisional section of the color filter 4 and the structure of the black matrix 4BM used are basically the same as the corresponding constitutional elements of the color filter 1 stated above. Likewise, there are sections 40t and 40r corresponding to the first area portion 10t and the second area portion 10r respectively.

In this embodiment, however, instead of that through holes 1h, the colorless portion 4H is provided, which has an effective area that is determined based on the calculation stated above or other experiences. In other words, the second area portion 40r is a part of the pixel portion 40 except the first area portion 40t, and is composed of a single colorless portion 4H and a coloring portion other than the portion 4H. Put another way, the pixel portion 40 is composed of a coloring material layer 4C (see FIG. 5) and the colorless portion 4H. In this embodiment, the colorless portion 4H is located at the lower-left corner of the rectangular pixel area, and shows an isosceles triangle of which a right-angle is assigned to the corner.

Figure 5:
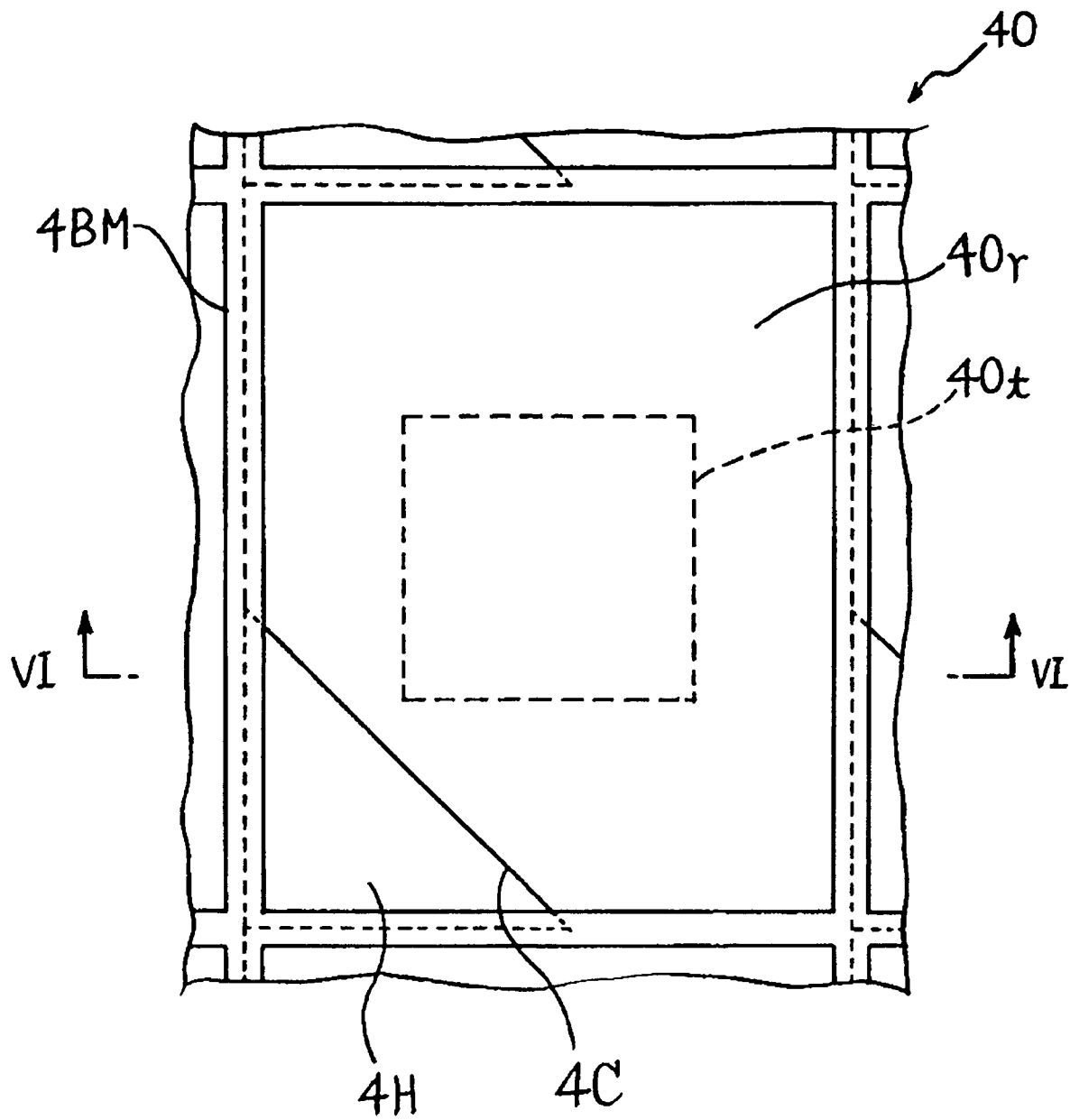
FIG. 5 is a schematic enlarged plan view of one pixel area of the color filter of FIG. 4.
Figure 6:
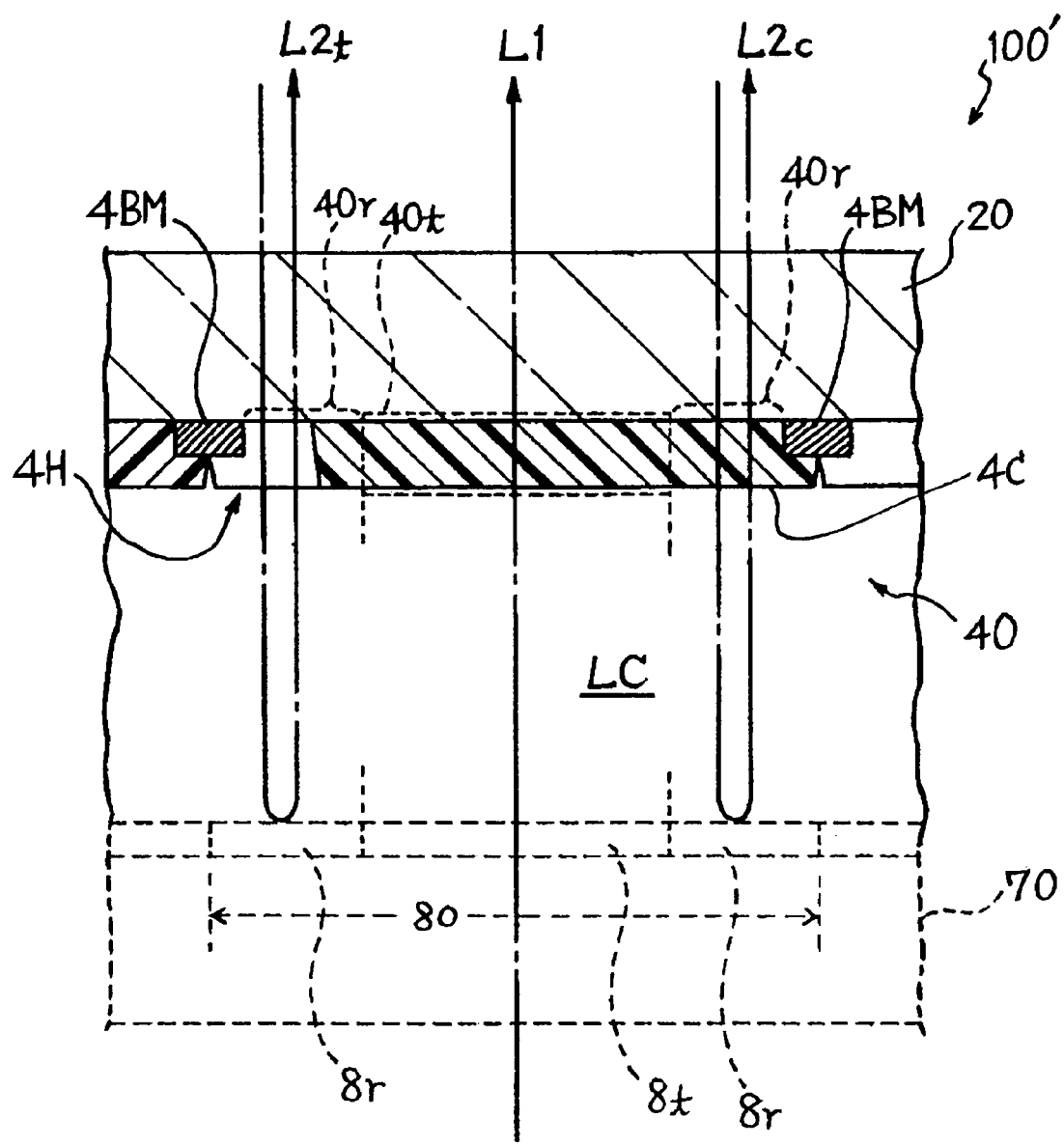
FIG. 6 is a schematic cross sectional view of the color filter taken along the cutting line VI—VI of FIG. 5 when incorporating it into a liquid crystal display panel.

FIG. 5 schematically shows an enlarged plan view of one pixel portion 40. FIG. 6 shows a cross sectional view of FIG. 5 along the cutting line VI—VI in case of incorporating this color filter into a liquid crystal display panel 100'. FIG. 5 also shows a plan view from the front side (the upper side in FIG. 6) of the liquid crystal display panel 100' in FIG. 6. It is noted that FIG. 6 basically shows the liquid crystal panel, wherein the minor layers, films, and construction thereof are omitted for the purpose of making clear illustration.

A coloring portion 4C of the pixel portion 40 comprises: the first area portion 40t for the first light ray L1; and a part of the second area portion 40r except the colorless portion 4H for a part L2c of the second light ray. As with the aforementioned first area portion 10t, the first area portion 40t also corresponds to the transparent electrode section 8t of a pixel electrode 80, and the second area portion 40r (including the colorless portion 4H) also corresponds to a reflective electrode section 8r of the pixel electrode 80.

The colorless portion 4H is a section through which an uncolored reflective light ray L2t that is a part of the second light ray, the section being formed, in this example, in an aperture form which is defined by the coloring portion 4C and which allows an under layer of the coloring portion 4C i.e. the substrate 20 as its supporting layer to be exposed. Accordingly, any light rays passed through the colorless portion 4H are not subjected to any coloring effects.

The first area portion 40t located within the coloring portion 4C shows, in this example, a rectangle whose center is at a center of the pixel area. The second area portion 40r including the colorless portion 4H is a part other than the rectangle, and is in a form of surrounding the first area portion. Thus, this embodiment is predicated on a fact that the electrode sections of the pixel electrode portion 80 have the similar shapes on the plan view to these areas 40t, 40r, respectively.

As shown in FIG. 6, the pixel portion 40 includes: a black matrix 4BM which is provided on the transparent substrate 20 in the front side of the liquid crystal display panel 100', and which comprises a light shield material formed on the inside of the panel; the coloring layer 4C consisting of e.g. a synthetic resin having a coloring ingredient, which is formed on the substrate 20 and the black matrix 4BM in an area delimited with the black matrix 4BM; and a colorless portion 4H consisting of an aperture (blank) whose profile or outline is defined by the coloring layer 4C.

As shown in FIG. 5, the coloring portion 4C is patterned in a shape without the triangle part of the colorless portion 4H in the rectangular pixel portion 40.

In this embodiment, the coloring material part corresponding to the colorless portion 4H is removed to form an aperture (or window) through which the transparent substrate 20 is peeped.

The light ray L1 from a back light system (not shown) is colored by the coloring material of the first area portion 40t after passing through the transparent electrode portion 8t and the liquid crystal layer LC, and is guided to the outside of the panel on the front side. On the one hand, one part L2c of the external light ray from the front side of the panel is once colored by the coloring material of the coloring portion 4C of the second area portion 40r after passing through the transparent substrate 20 and the coloring portion 4C, and reaches the reflecting electrode part 8r through the liquid crystal layer LC. And, the light ray L2c is reflected by the reflective electrode part 8r and returned to the part of the coloring portion 4C of the second portion 40r again through the liquid crystal layer LC and is once again colored by the coloring portion, and then passes through the transparent substrate 20 to be guided to the outside of the panel on the front side. On the other hand, another part L2t of the external light ray from the front side of the panel, entering the colorless portion 4H, is not colored by the coloring material of the color filter after passing through the transparent substrate 20, and reaches the reflecting electrode part 8r through the liquid crystal layer LC. And, the light ray L2t is reflected by the reflecting electrode part 8r and returned to the colorless portion 4H again through the liquid crystal layer LC. And also, the light ray L2t is not colored by the colorless portion 4H, and is guided to the outside of the panel on the front side through the transparent substrate 20.

As stated above, the colorless portion 4H does not color the incident light ray, so that it can reduce the coloring effect for the ambient light entering to the pixel area. Accordingly, advantages can be obtained as is in the first embodiment.

It is noted that in this composition the reflected light to be colored by nature is made to be colorless by a single independent area, so that spotted areas are made in microscopic observation, but thus localized colorless light may be neglected for displaying images in macroscopic observation in which one views an entire display screen.

And, it is noted that the action of the colorless portion 4H, resulting in the reducing the coloring effect for the reflected light may be adjusted e.g. by setting the area size or the like based on the same conception to the first embodiment.

Furthermore, the embodiment acquires peculiar advantages by forming the colorless portion 4H in a triangle shape as shown in FIG. 5.

Figure 7:
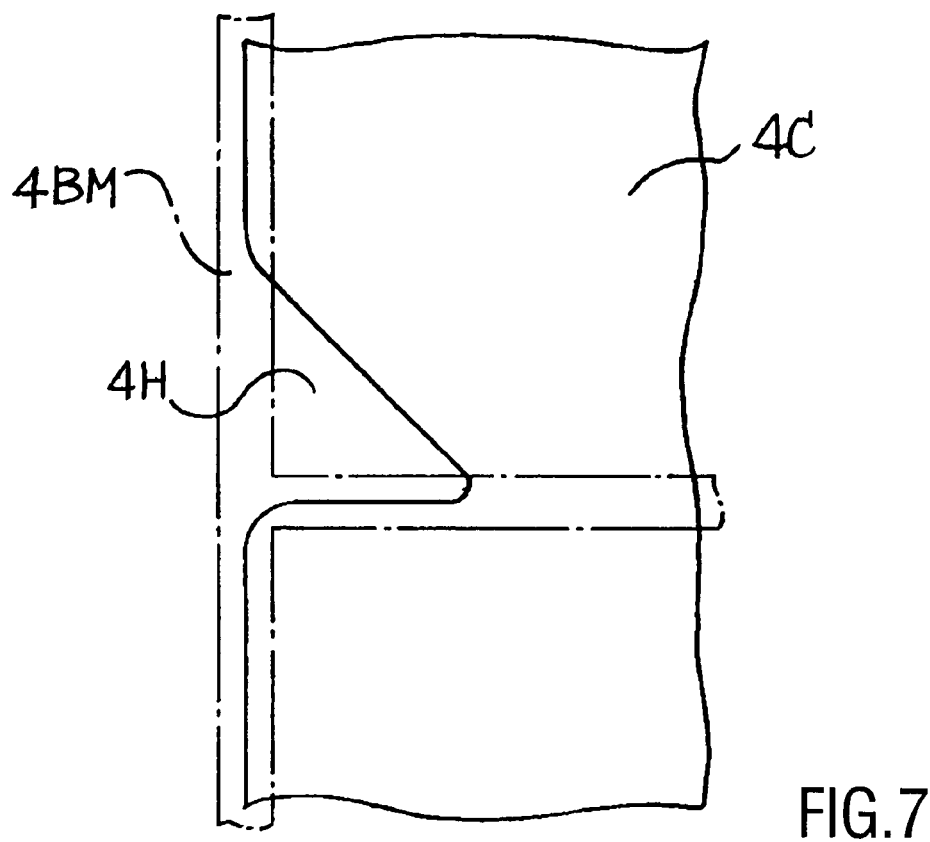
FIG. 7 is a schematic plan view of the color filter according to the second embodiment for describing advantages of the second embodiment.
Figure 8:
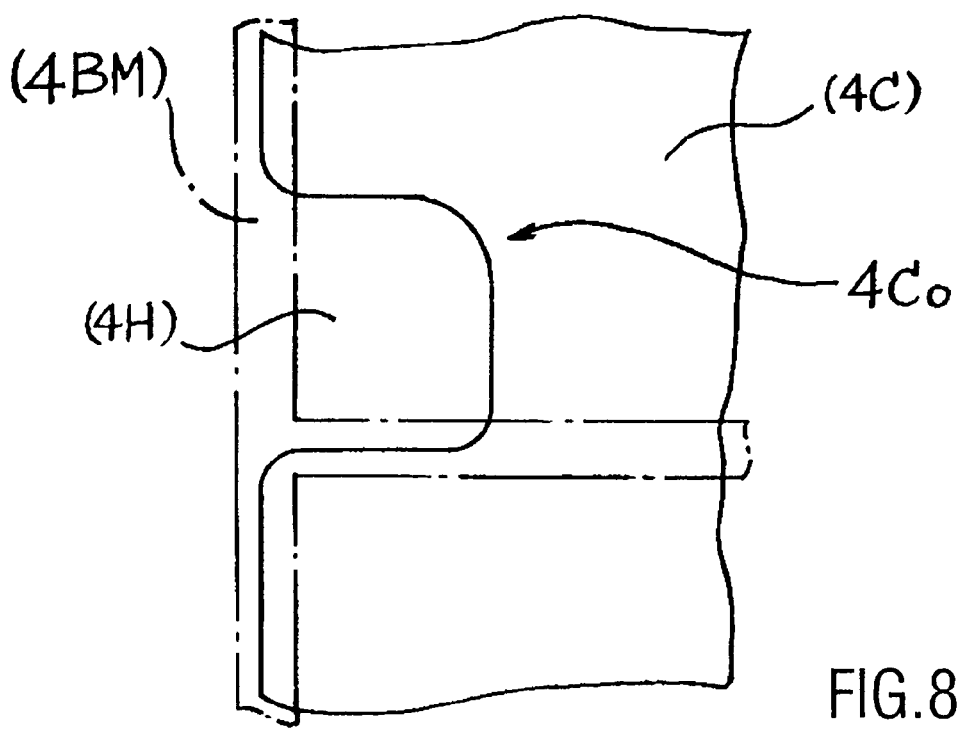
FIG. 8 is a schematic plan view of a color filter according to a comparison example for describing advantages of the second embodiment.

FIG. 7 shows an enlarged view of the more real colorless portion 4H, and FIG. 8 shows a comparative sample therewith given for explaining the peculiar advantages.

In order to form the colorless portion 4H, the coloring portion 4C is formed in the shape (a kind of the saw teeth shape) shown in FIG. 5, by means of a patterning process wherein etching-removing is partially performed in much the same fashion as a patterning process using a common stripe-formed mask corresponding to the longitudinal coloring area portions. However, the coloring portion 4C actually obtained becomes like as shown in FIG. 7 in microscopic observation. That is, the corners of the outline of the coloring portion 4C in the plan view are not sharp ones shown in FIG. 5 but blunt ones like as shown in FIG. 7. In other words, each corner of the coloring portion 4C becomes rounder. By contrast, the straight-line portions of the outline of the coloring portion 4C in the plan view are easy formed in a straight line shape with relatively great precision almost as expected.

In this embodiment, because of forming the colorless portion 4H to such a triangle shape that it is obtained by trimming one corner of the rectangular pixel portion 40, rounder portions of the coloring portion 4C can be limited to only boundaries of the pixel such as the left side and the lower side in FIG. 7, so that all these rounder portions can be hidden by the black matrix 4BM. By virtue of the combination with the black matrix, it is possible to accurately form the colorless portion 4H having desired shape and area size. Furthermore, there is also an aspect that such triangle shaped colorless portions 4H have little variations and are easy formed in relatively equal areas.

By constant, in the case of forming the colorless portion (4H) in a rectangle, the rounder portion 4Co would remain in the coloring portion (4C) even if it were combined with the black matrix (4BM), as shown in FIG. 8. Such a rounder portion is difficult to be predicted with regard to its degree of roundness. In addition the rounder portions would have a wide range of variations, so that they should be exceedingly disadvantageous in respect that the colorless portions are formed with desired shape and area size.

In this embodiment, a planar shape of the colorless portion 4H is an isosceles triangle to thereby further offer a more advantageous example than a scalene triangle. That is, as long as the colorless portion 4H is the isosceles triangle, even if the mask to be used for patterning of the coloring portion 4C deviates in upward and downward directions and/or leftward and rightward directions, then the colorless portion 4H shows the geometrically similar isosceles triangle and changes its area with an across-the-board degree in accordance with the deviation. By constant, in the case of the non-isosceles triangle, the degree of area-changing when it deviates in the upward and downward directions differs from that when it deviates in the leftward and rightward directions. Upon reconsidering the matter, in the case of the isosceles triangle such as in this embodiment, the area-changing of the colorless portion 4H responsive to the deviation of the mask is easy in control, so that an advantage can be expected in that a high accuracy on forming the mask or the like is not required.

Furthermore, in the case of forming colorless portions having the same area size, by making the areas triangle-shaped, it is able to easy make a length of the edge of the coloring portion 4C along which the outline of the colorless portion 4H is formed to be shorter than in the case of the other shaped areas. Therefore, the step portion between the coloring portion 4C and the colorless portions 4H can be made smaller to advantageously contribute to flattening a surface of the color filter.

[Embodiment 3]

In the second embodiment, the description has been given about the example in the case of forming the colorless portions 4H in a triangle shape, but the peculiar advantages can also be obtained by forming them in other shapes.

Figure 9:
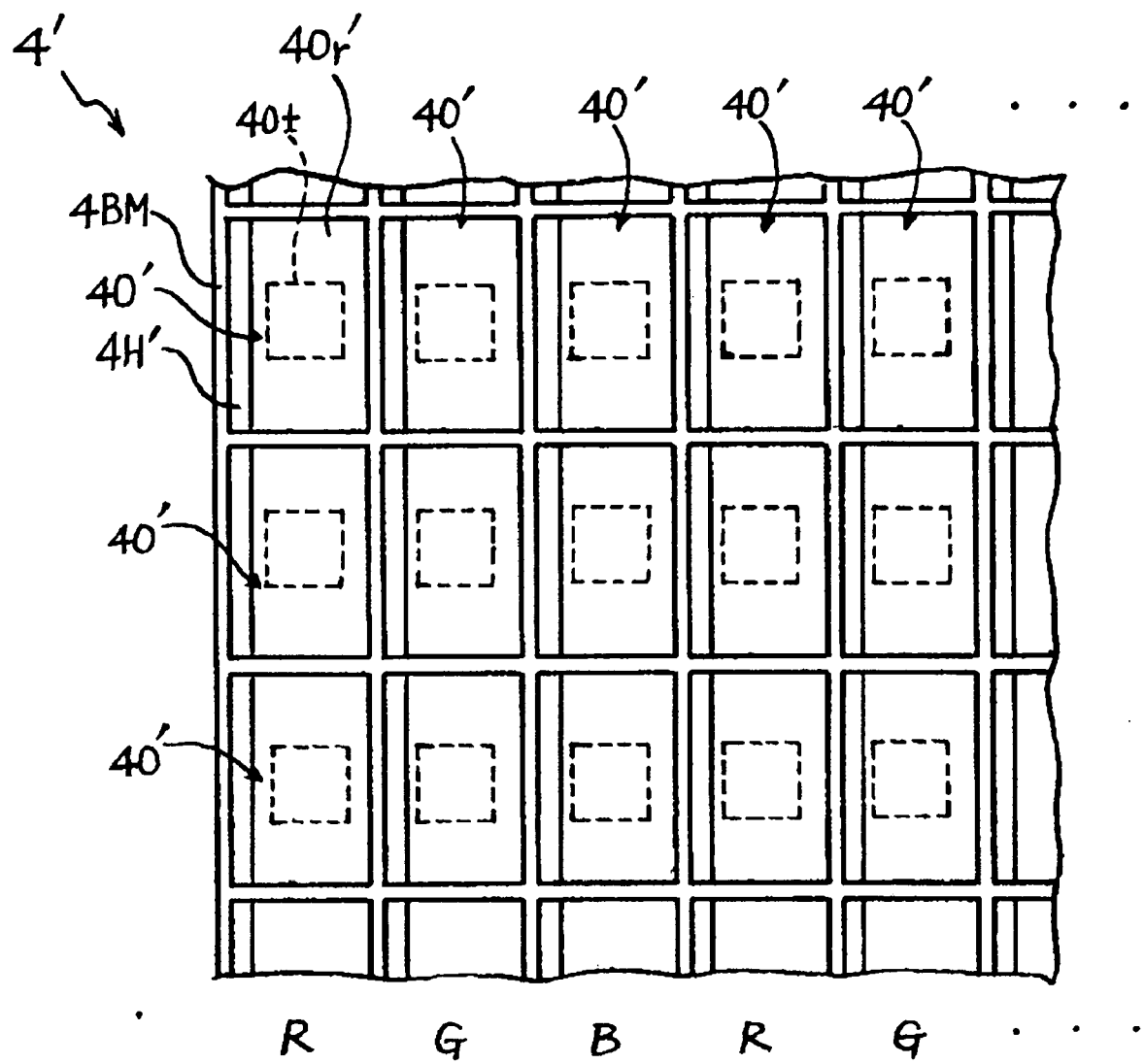
FIG. 9 is a schematic plan view of a color filter used in a liquid crystal display device according to the third embodiment of the present invention.
Figure 10:
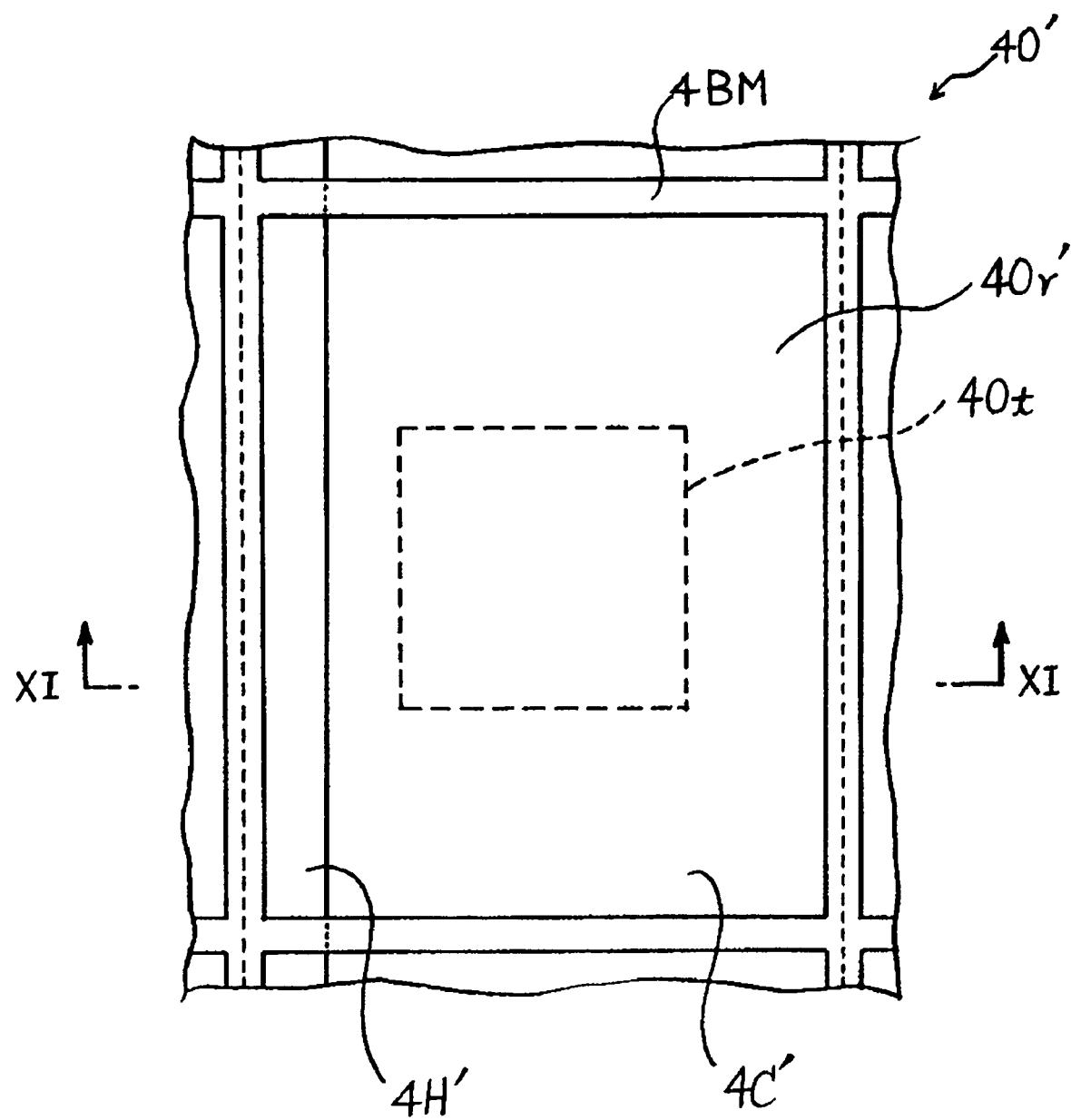
FIG. 10 is a schematic enlarged plan view of one pixel area of the color filter of FIG. 9.
Figure 11:
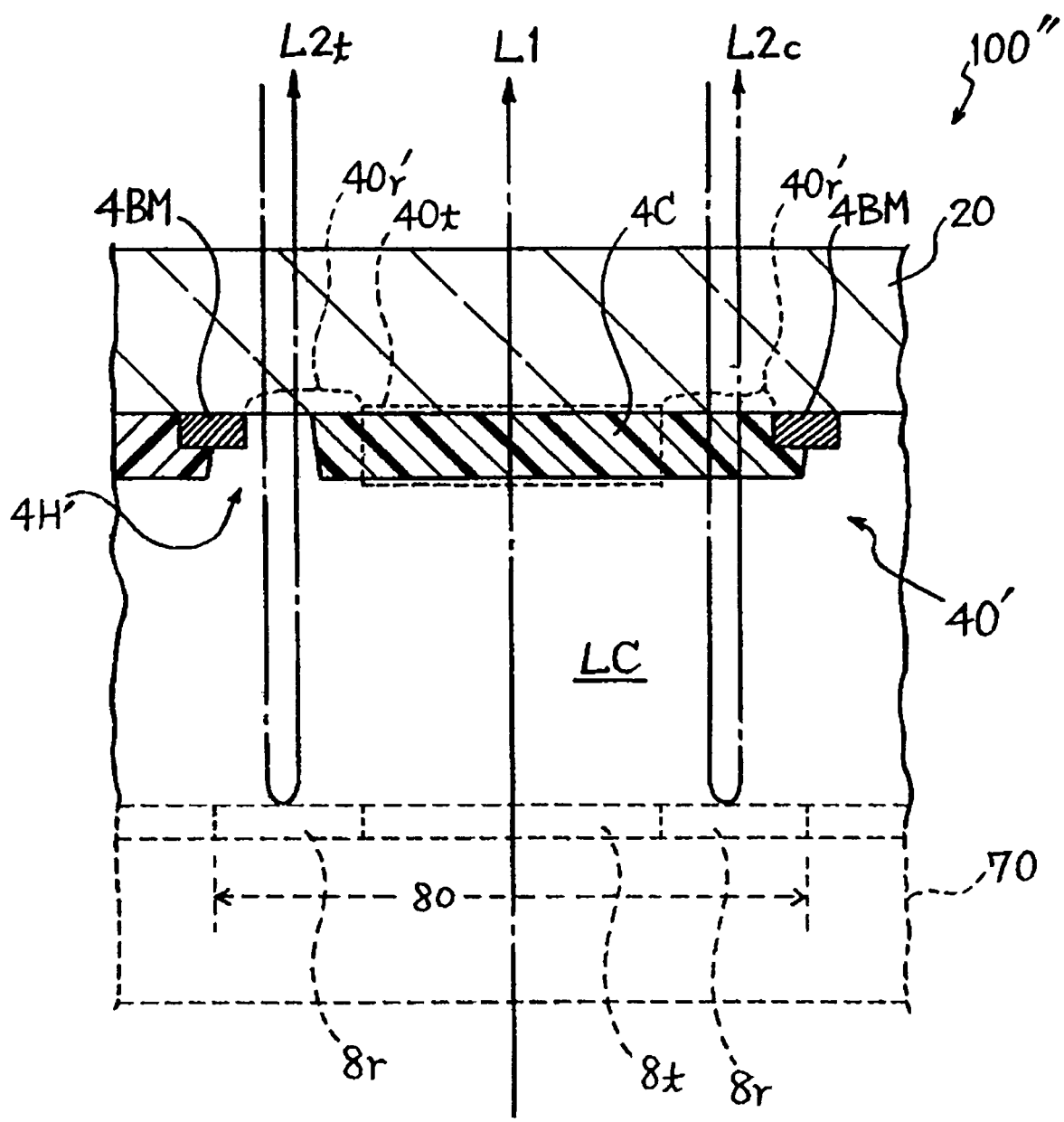
FIG. 11 is a schematic cross sectional view of the color filter taken along the cutting line XI—XI of FIG. 10 when incorporating it into a liquid crystal display panel.

FIG. 9 schematically and in general shows in a plan view a color filter 4' of this embodiment. FIG. 10 shows a view partly enlarged therefrom, and FIG. 11 shows a cross-sectional view of FIG. 10 along the cutting line XI—XI.

As is evident from FIG. 9, the colorless portion 4H' is formed in a rectangle that extends along the entire one side of the rectangular pixel portion 40' in a shape of straight line near the side. This colorless portion 4H' of this example may be a groove-shaped portion extending in a vertical direction of the display screen as seen from FIG. 11.

Also by forming such a colorless portion 4H', all the edges of the coloring portion 4C' appearing in a pixel area are straight line shaped, so that the variations are in a narrow range and the colorless portion 4H' is easy to be accurately formed with the desired area. Besides, this embodiment is realized by just narrowing the width of the coloring portion 4C'. Therefore, the patterning process in the embodiment may be a very similar to a patterning process used in the prior art for stripe shaped coloring portions, so that an advantage concerning a management of manufacturing processes is expected.

[Embodiment 4]

Figure 12:
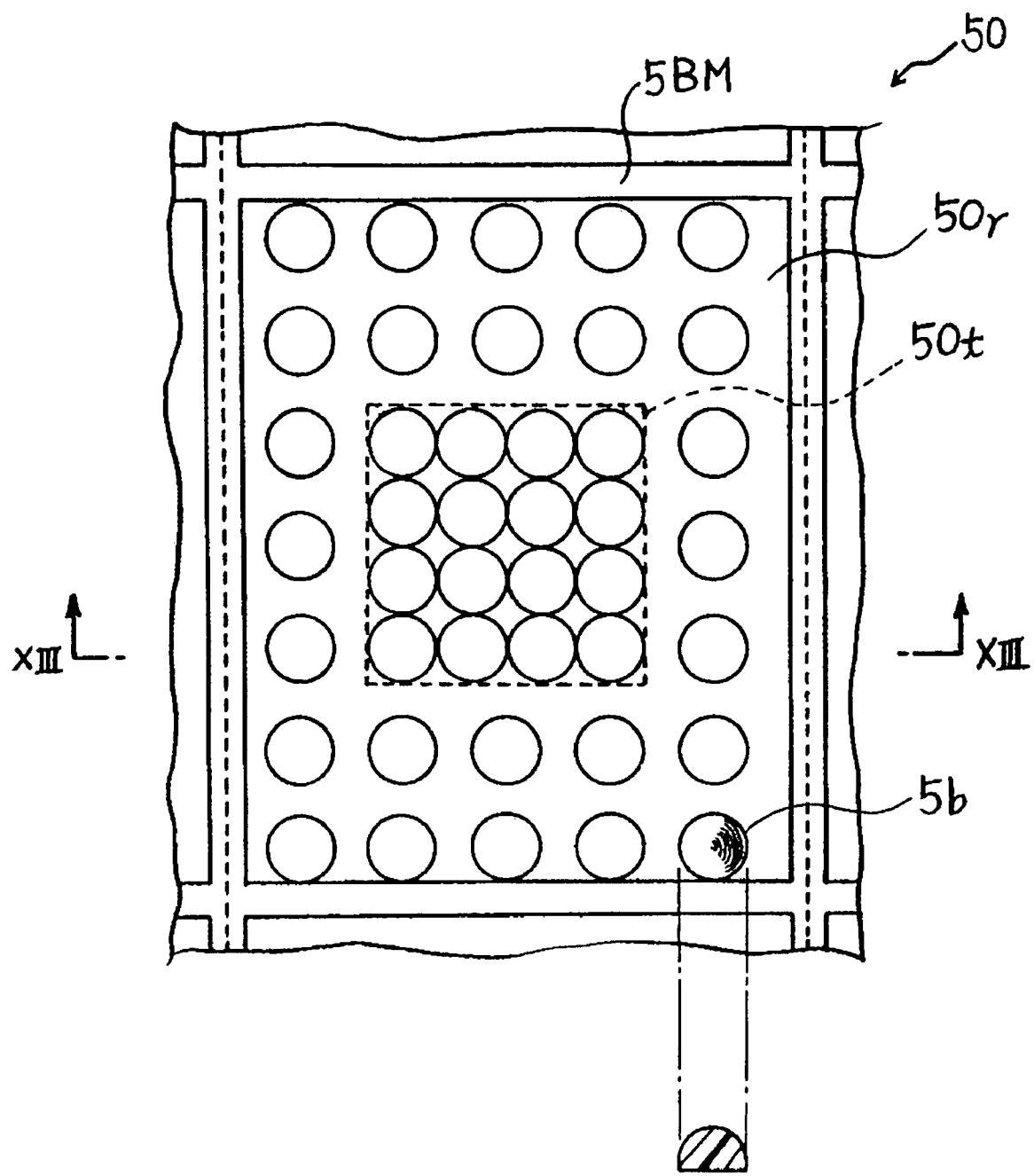
FIG. 12 is a schematic enlarged plan view of one pixel area in the color filter used for a liquid crystal display device according to the fourth embodiment of the present invention.
Figure 13:
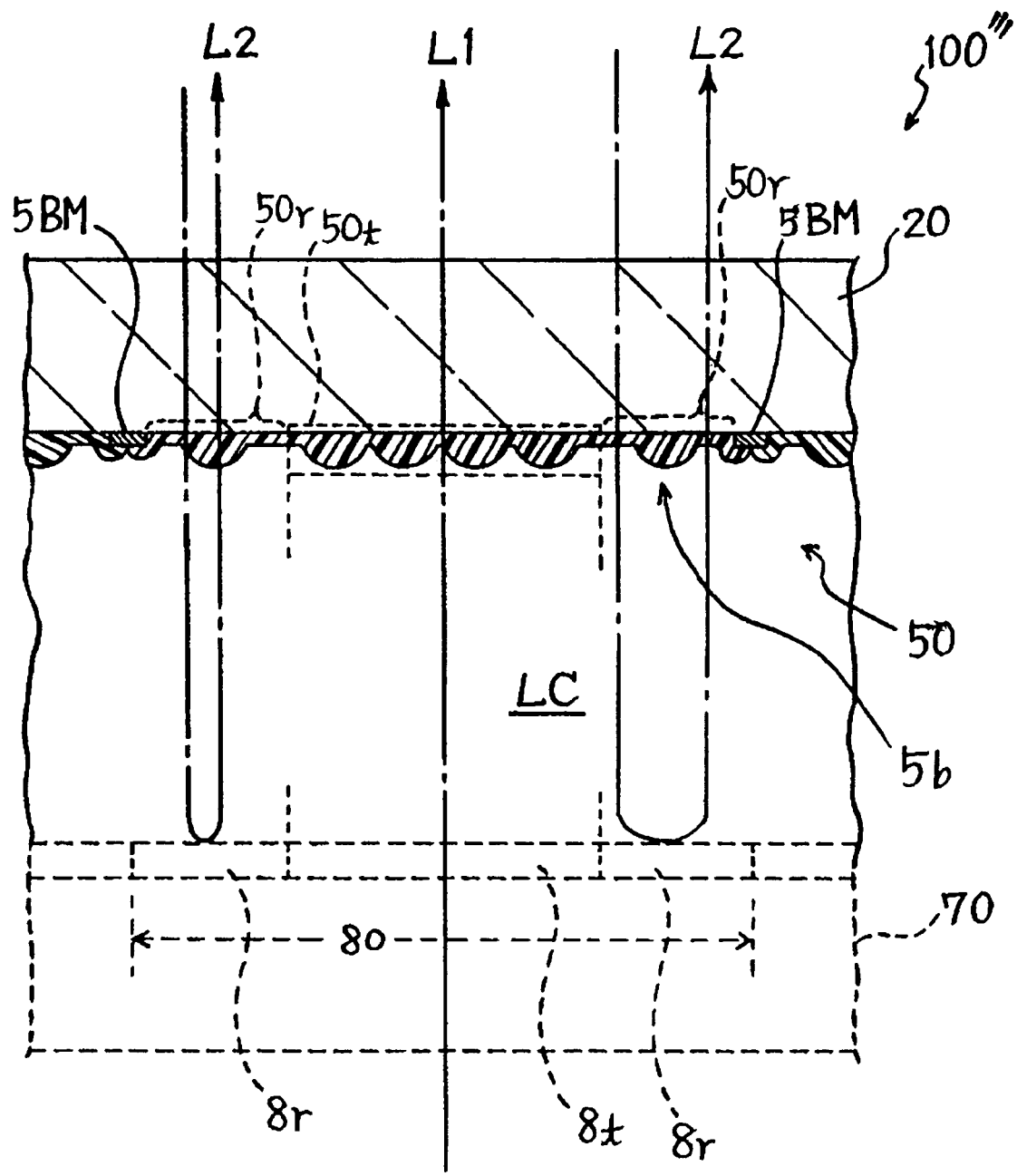
FIG. 13 is a schematic cross sectional view of the color filter taken along the cutting line XIII—XIII of FIG. 12 when incorporating it into a liquid crystal display panel.

In order to provide the different coloring effects to the first area portion and the second area portion, yet another constitution as shown in FIGS. 12 and 13 is available.

FIG. 12 schematically shows an enlarged plan view of a pixel portion 50 of the color filter according to the fourth embodiment and FIG. 13 shows a sectional view of FIG. 12 along the cutting line XIII—XIII in the case of installing this color filter onto a liquid crystal display panel 100'''.

In this embodiment, the first area portion 50t and the second area portion 50r have such structures that their densities of coloring element formed are different from each other. To this end, each of the first area portion 50t and the second area portion 50r has at least a surface layer portion formed in a plurality of coloring element construction units, in this example, based on a projecting body element of coloring material used as a construction unit pattern (bump, more specifically a generally hemispherical protuberance) and bumps 5b of the first area portion 50t are formed with a higher density than bumps 5b of the second area portion 50r.

According to this embodiment, it is possible to make a difference in construction between the first area portion and the second area portion for achieving the intended object, while it is possible to easy make a difference of the effective surface area or volume of coloring elements to work on the coloring effects for the incident light rays between the first area portion 50t and the second area portion 50r by a patterning process.

[Embodiment 5]

Figure 14:
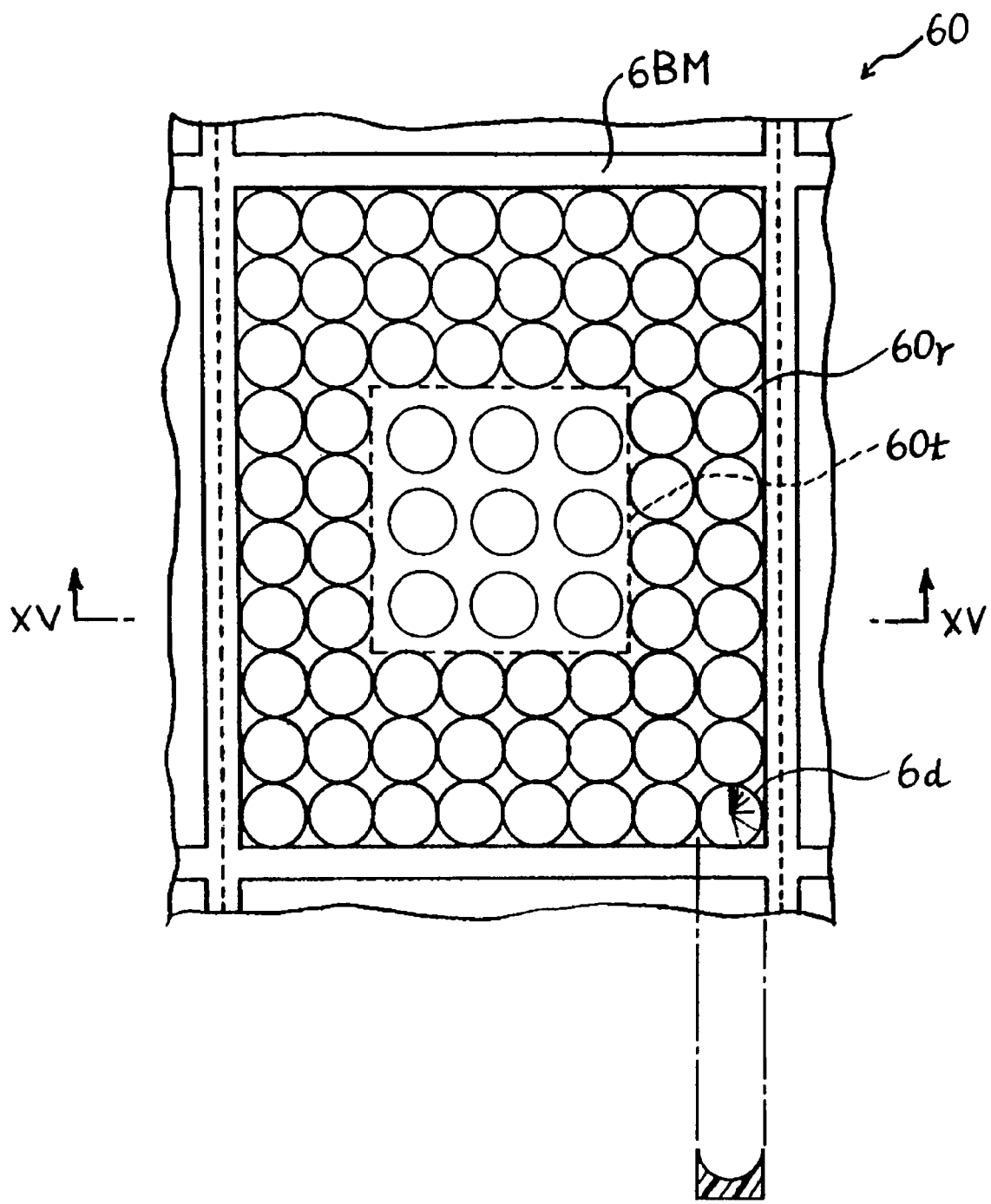
FIG. 14 is a schematic enlarged plan view of one pixel area in the color filter used for a liquid crystal display device according to the fifth embodiment of the present invention.
Figure 15:
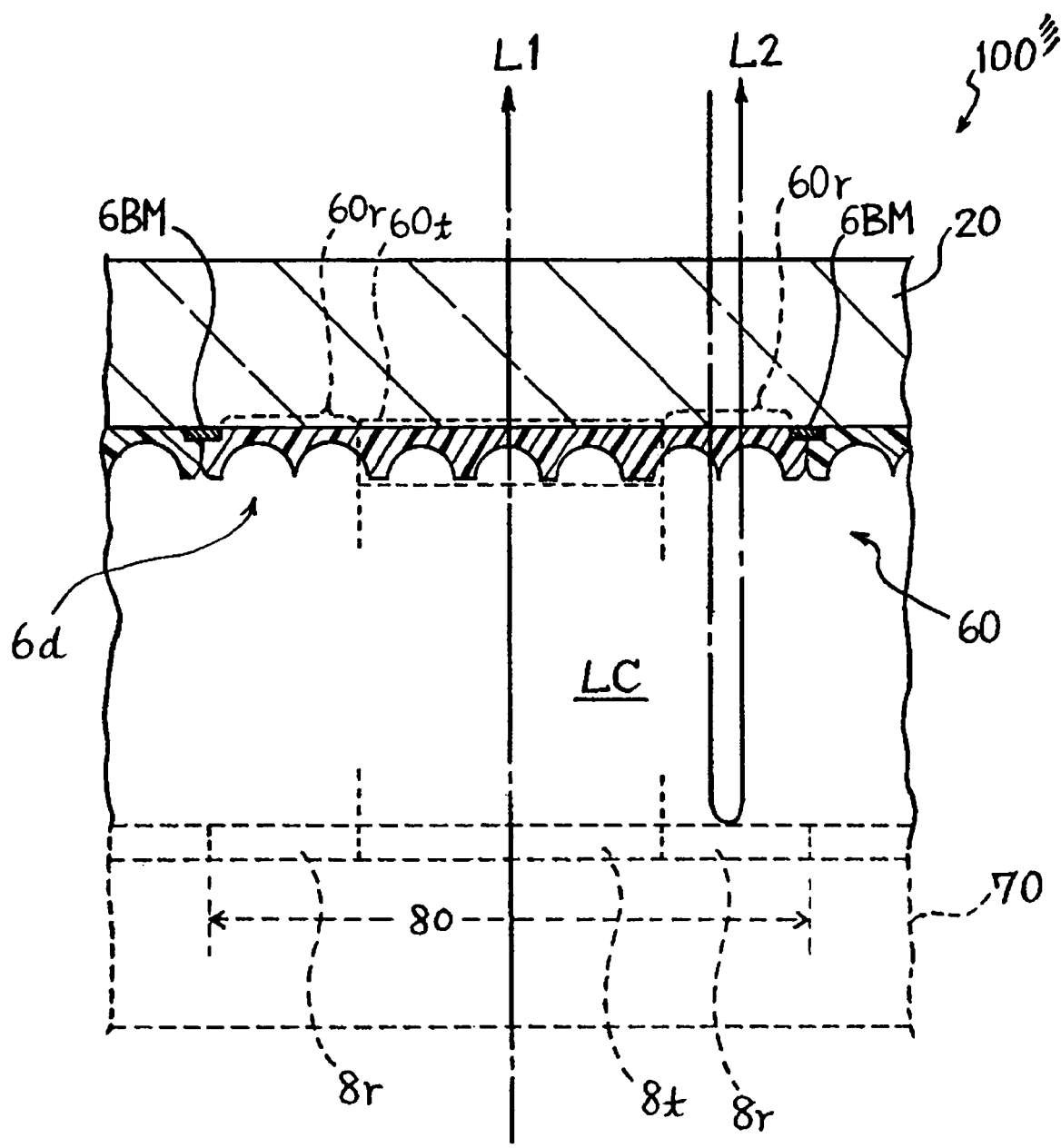
FIG. 15 is a schematic cross sectional view of the color filter taken along the cutting line XV—XV of FIG. 14 when incorporating it into a liquid crystal display panel.

Furthermore, a configuration as shown in FIGS. 14 and 15 is also implemented.

FIG. 14 schematically shows an enlarged plan view of a pixel portion 60 of a color filter according to the fifth embodiment, and FIG. 15 shows a sectional view of FIG. 14 along the cutting line XV—XV in the case of installing this color filter in a liquid crystal display panel 100''''.

This embodiment also proposes that the first area portion 60t and the second area portion 60r have such structures that their densities of coloring element formed are different from each other. To this end, each of the first area portion 60t and the second area portion 60r has at least a surface layer portion formed in a plurality of coloring element construction units, in this example, based on a depression body element of coloring material used as a construction unit pattern (dimple, more specifically a generally hemispherical hollow) and a dimples 6d of the second area portion 60r are formed, here, with a higher density than dimples 6d of the first area portion 60t.

According to this embodiment it is possible to make a difference in construction between the first area portion and the second area portion for achieving the intended object, while it is possible to easy make a difference of the effective surface area or volume of coloring elements to work on the coloring effects for the incident light rays between the first area portion 60t and the second area portion 60r by a patterning process.

It is noted that the first area portion and the second area portion are formed based on the pattern of bumps or dimples, so that their surfaces are roughened, whereby the incident light rays can be diffused. These diffused light rays improve a visible angle characteristic on the display screen to contribute to further improvement of visibility, and in particular, it is effective on the light ray L2 in the reflection mode.

Furthermore, there may be an embodiment based on combination of features of the fourth and fifth embodiments. That is, it may be intended to obtain the desired difference in coloring effect by combining the first area portion 50t (high density formational structure of coloring element) in the fourth embodiment with the second area portion 60r (low density formational structure of the same) in the fifth embodiment, and alternatively to obtain the desired difference in coloring effect by combining the first area portion 60t (high density formational structure of the same) in the fifth embodiment and the second area portion 50r (low density formational structure of the same) in the fourth embodiment.

In the embodiments stated above, since the pixel portion is provided with the holes 1h, colorless portion 4H, 4H' or has form of projections and depressions of the bumps 5b and the dimples 6d, some stepped portion is formed in the coloring portion to degrade the surface flatness of the whole color filter. Such a step would be often disadvantageous with regard to aspect of the optical characteristics or the like.

Figure 16:
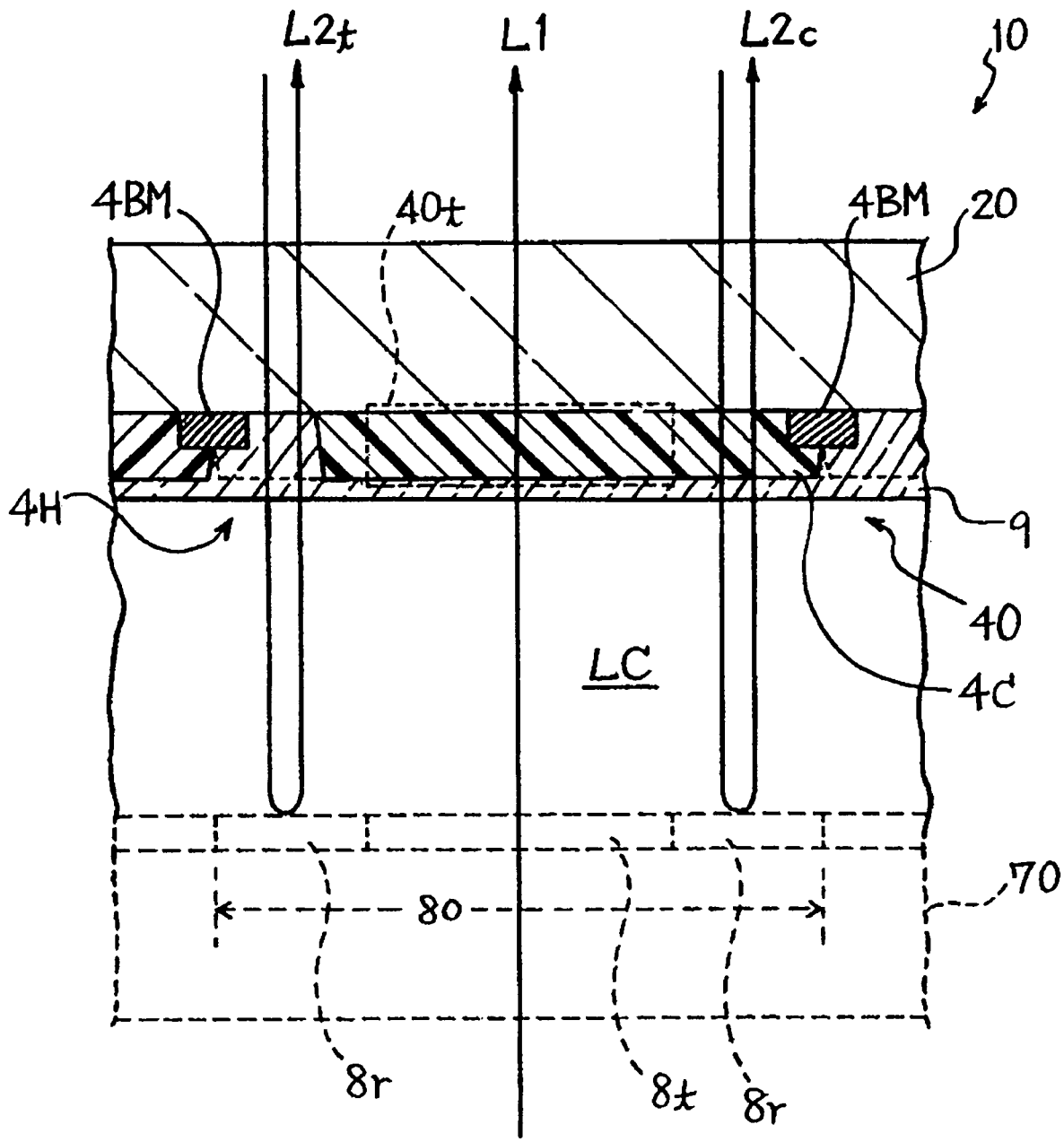
FIG. 16 is a schematic cross sectional view of a color filter according to a modification of the second embodiment.

In view of this point an example that improves the second embodiment is shown in FIG. 16 as the representative. In this embodiment, a protective layer 9 as an over coat layer consisting of a synthetic resin is overlaid on the coloring portion 4C and the colorless portion 4H for protecting the coloring portion 4C, and the aperture portion of the colorless portion 4H is buried to flatten the surface of the color filter. This protective layer consists of the optically transparent material, so that it is able to exert no influence upon the coloring effect of the color filter.

By virtue of this flattening of the surface of the color filter by the protective layer 9, faces on which light is incident in the surface are made uniform. This can prevent e.g. the unexpected light leakage caused by asperities associated with openings of the colorless portion 4H to significantly contribute to improvement in the optical characteristics.

Furthermore, even if other film such as an orientation film (not shown) or the like is provided on the color filter, the coloring portion 4C is avoided from directly being in contact with the other film, so that there is an advantage in that contamination of the liquid crystal layer is prevented. In addition, by virtue of the flattening of the surface of the color filter, it is convenient to avoid irregularity of the orientation in an orientation layer or the liquid crystal layer LC arranged on or above.

Also in the other embodiment, providing the protective layer 9 in much the same manner leads to the same advantages. However, in the case of a specific composition such as the Embodiments 1, 4 and 5, the degree of evenness is small, so that the protective layer can be thinner than one applied to the Embodiment 2 when the same flatness of filter is intended. That is, the specific composition itself has high flatness of the surface of the color filter, so that it can be said that little influence caused by the uneven shape is exerted upon the other layers.

By the way, in the embodiments as stated above, it has been mentioned that the pixel portion of the color filter is rectangular, and it has been mentioned about the examples of including the rectangle-shaped first area portion for transmission and the second area portion for reflection, having a shape of surrounding the first area portion. However, the present invention is not necessarily limited to such examples. Such a pixel portion (pixel area) may be in other type of shape than a rectangle, such as a polygon having 5 or more sides. The first area portion may be in other type of shape than a rectangle likewise, and/or may be divided into plural sections.

Fundamentally, the area for transmission and the area for reflection in the color filter correspond to the areas (in the embodiments given herein, respective areas of the transmissive portion and the reflective portion formed in the pixel electrode) assigned for the first light (ray) and the second light (ray) handled in the display device in question, respectively. The areas for transmission and reflection are the same as the assigned areas in shape, layout and the number. Therefore, instead of the rectangle shaped first area portion and the second area portion surrounding the first area portion in the above-mentioned embodiments, the first area portion may be circle-shaped in a plan view, almost rectangle-shaped but rounding-shaped (including an ellipse), or polygon-shaped based on 5 or more surrounding sides.

It is noted that other various modifications can be realized in the present invention. For example, the pixel portions may be in the other shape than a grid pattern as shown FIGS. 1. 4 and 9. Although there has been mentioned the example in which the color filter is directly formed on the substrate 20 in the above embodiments, some under layer may be inserted between the substrate 20 and the color filter. Namely, the present invention is directed to a color filter that may be supported by any base layer including such an underlayer and the substrate.

Instead of the protective layer 9 being perfectly transparent without any color, it may be one having some coloring property for a certain desired purpose. In the above embodiments, there is stated a color filter based on R, G, B primary colors for making full color pictures, but the present invention is applicable to a monochrome color filter dedicated to monochrome pictures.

The preferred embodiments described herein are therefore illustrative and not restrictive, the scope of the present invention being indicated by the appended claims, and all variations which come within the meaning of the claims are intended to be embraced therein.

The invention claimed is:

1. A color filter for coloring a first light ray having a unidirectional optical path and a second light ray having a bidirectional optical path for each pixel, the color filter including:
    a first area portion in which the first light ray is caused to be transmitted and
    a second area portion in which the second light ray is caused to be transmitted,
    for each pixel, the first area portion and the second area portion respectively having structures by which different coloring effects are exerted if light rays having the same optical path and the same property pass through them,
    wherein
    each of the first area portion and the second area portion has a coloring element surface that is patterned based on a plurality of unit patterns, and
    the first area portion and the second area portion have different densities of the unit patterns per surface area of the pixel.

2. The color filter of claim 1, wherein the first area portion and the second area portion have such a difference in densities of the unit patterns that a coloring effect performed for the first light ray within a pixel by the first area portion is substantially equal to a coloring effect performed for the second light ray within a pixel by the second area portion under predetermined conditions.

3. The color filter of claim 1, wherein the second area portion includes a coloring portion that colors the second light ray and at least one colorless portion that transmits the second light ray substantially with colorlessness.

4. The color filter of claim 1, wherein the unit pattern is projection-shaped, and the unit patterns of the first area portion has a higher density than the unit patterns of the second area portion.

5. The color filter of claim 1, wherein the unit pattern is depression-shaped, and the unit patterns of the first area portion have a lower density than the unit patterns of the second area portion.

6. The color filter of claim 1, wherein the unit pattern has a shape with a function of diffusing incident light.

7. The color filter of claim 1, wherein the first and second area portions are formed from the same coloring material.

8. The color filter of claim 1, wherein the color filter includes a protective film covering the first and second area portions.

9. The color filter as defined in claim 3, wherein a plurality of the colorless portions are dispersedly located over the second area portion.

10. The color filter of claim 3, wherein the pixel area has substantially a polygon shape on a plan view, and the colorless portion is located in the vicinity of a corner of the polygon in a pixel area.

11. The color filter of claim 3, wherein the pixel area has substantially a polygon shape on a plan view, and the colorless portion has a shape of substantially a triangle including a corner of the polygon and having an oblique side opposed to that corner in a pixel area.

12. The color filter of claim 11, wherein the colorless portion is isosceles-triangle-shaped on the plan view.

13. The color filter of claim 3, including a shield disposed about a boundary of the pixel area.

14. The color filter of claim 11, wherein the shield is configured to hide, from a display screen side of the color filter, peripheral portions of the colorless portion that do not have a substantially straight-line shape.

15. The color filter of claim 3, wherein the pixel area is substantially polygon-shaped on a plan view, and the colorless portion is formed in the vicinity of any one side of the polygon along that side.

16. The color filter of claim 4, wherein a ratio of an effective area of the colorless portion to an effective area that the optical path of the second light ray occupies is determined in a pixel area for each color to be made.

17. The color filter of claim 3, wherein an effective area of the colorless portion is determined in such a manner that a chromaticity of the first light ray obtained by a coloring effect of the first area portion in a pixel area is substantially equal to a chromaticity of the second light ray obtained by a coloring effect of the second area portion in the pixel area for each color to be made.

18. A liquid crystal display device using the color filter of claim 1.

19. The liquid crystal display device of claim 18, wherein: the color filter is provided to one substrate of the liquid crystal display device; an other substrate is provided with a pixel electrode that includes a transmissive electrode part for making the first light ray to be transmitted therethrough and a reflective electrode part for making the second light ray to be reflected therefrom; and the first area portion in the color filter corresponds to the transmissive electrode part while the second area portion corresponds to the reflective electrode part.

20. A manufacturing method for a liquid crystal display device using the color filter of claim 1, wherein the color filter is provided to one substrate of the liquid crystal display device and an other substrate is provided with a pixel electrode that includes a transmissive electrode part for making the first light ray to be transmitted therethrough and a reflective electrode part for making the second light ray to be reflected therefrom, wherein the manufacturing method includes aligning the first area portion in the color filter with the transmissive electrode part and aligning the second area portion with the reflective electrode part.

21. A color filter for coloring a first light ray having a unidirectional optical path and a second light ray having a bidirectional optical path for each pixel, the color filter including:
    a first area portion in which the first light ray is caused to be transmitted, and
    a second area portion in which the second light ray is caused to be transmitted,
    for each pixel, the first area portion and the second area portion respectively having structures by which different coloring effects are exerted if light rays having the same optical path and the same property pass through them,
    wherein
    each of the first area portion and the second area portion is formed based on a plurality of coloring element construction units having a non-uniform profile, and in that the coloring element construction units of the first area portion have a higher density than those of the second area portion.

22. A color filter for coloring a first light ray having a unidirectional optical path and a second light ray having a bidirectional optical path for each pixel, the color filter including:
    a first area portion in which the first light ray is caused to be transmitted, and
    a second area portion in which the second light ray is caused to be transmitted,
    for each pixel, the first area portion and the second area portion respectively having structures by which different coloring effects are exerted if light rays having the same optical path and the same property pass through them,
    wherein
    the first area portion and the second area portion have coloring element surfaces that are patterned based on a plurality of first unit patterns and on a plurality of second unit patterns, respectively, and in that the unit pattern densities of the first area portion and the second area portion are determined so that the first and second area portions have such structures that coloring element forming densities of the first and second area portions are different from each other.

23. The color filter of claim 22, wherein the first unit pattern has one of projection shape and depression shape, and the second unit pattern has an other of projection shape and depression shape.

24. A method of manufacturing a color filter for coloring a first light ray having a unidirectional optical path and a second light ray having a bidirectional optical path for each pixel, comprising:
    depositing a coloring material for coloring the first and second light rays on a base layer; and
    patterning the deposited layer of coloring material to form, for each pixel, a first area portion in which the first light ray is caused to be transmitted and a second area portion in which the second light ray is caused to be transmitted, the first area portion and the second area portion respectively having structures by which different coloring effects are exerted if light rays having the same optical path and the same property pass through those area portions, each of the structures of the first area portion and the second area portion having a non-uniform profile.

25. The method of claim 24, including forming a black matrix for delimiting a pixel area on the base layer before the coloring material deposition step.

26. The method of claim 24, wherein the method includes forming a protective layer at least in part on the first and second area portions.

* * * * *